United States Patent [19]

Hirose et al.

[11] 4,380,782

[45] Apr. 19, 1983

[54] DRIVE APPARATUS FOR FLEXIBLE MAGNETIC DISCS

[75] Inventors: Yasuyuki Hirose; Motohiro Shimaoka; Shoichiro Saito; Toru Kowaguchi, all of Furukawa, Japan

[73] Assignee: Alps Electric Co., Ltd., Tokyo, Japan

[21] Appl. No.: 107,067

[22] Filed: Dec. 26, 1979

[30] Foreign Application Priority Data

Dec. 28, 1978 [JP] Japan .................. 53-162525

[51] Int. Cl.³ .............. G11B 5/016; G11B 17/02; G11B 21/12
[52] U.S. Cl. ................................ 360/99; 360/105
[58] Field of Search ............... 360/99, 97, 105, 106

[56] References Cited

U.S. PATENT DOCUMENTS

| | | | |
|---|---|---|---|
| 4,012,791 | 3/1977 | Bleiman | 360/105 |
| 4,024,581 | 5/1977 | Lesca et al. | 360/106 |
| 4,193,102 | 3/1980 | Beuch et al. | 360/99 |
| 4,218,714 | 8/1980 | Isozaki et al. | 360/105 |

*Primary Examiner*—Robert S. Tupper
*Attorney, Agent, or Firm*—Guy W. Shoup; Gerard F. Dunne

[57] ABSTRACT

A disc drive apparatus for use in recording data on a flexible magnetic disc and/or reproducing data recorded on such a disc, has small dimensions and is capable of being manufactured at a low cost. This apparatus includes structures for preventing a disc and the read/write head from colliding when the disc is inserted into the apparatus. In addition, the apparatus permits two discs to be rotated simultaneously by one drive motor and one carriage carrying two head mechanisms is moved by one step motor.

11 Claims, 22 Drawing Figures

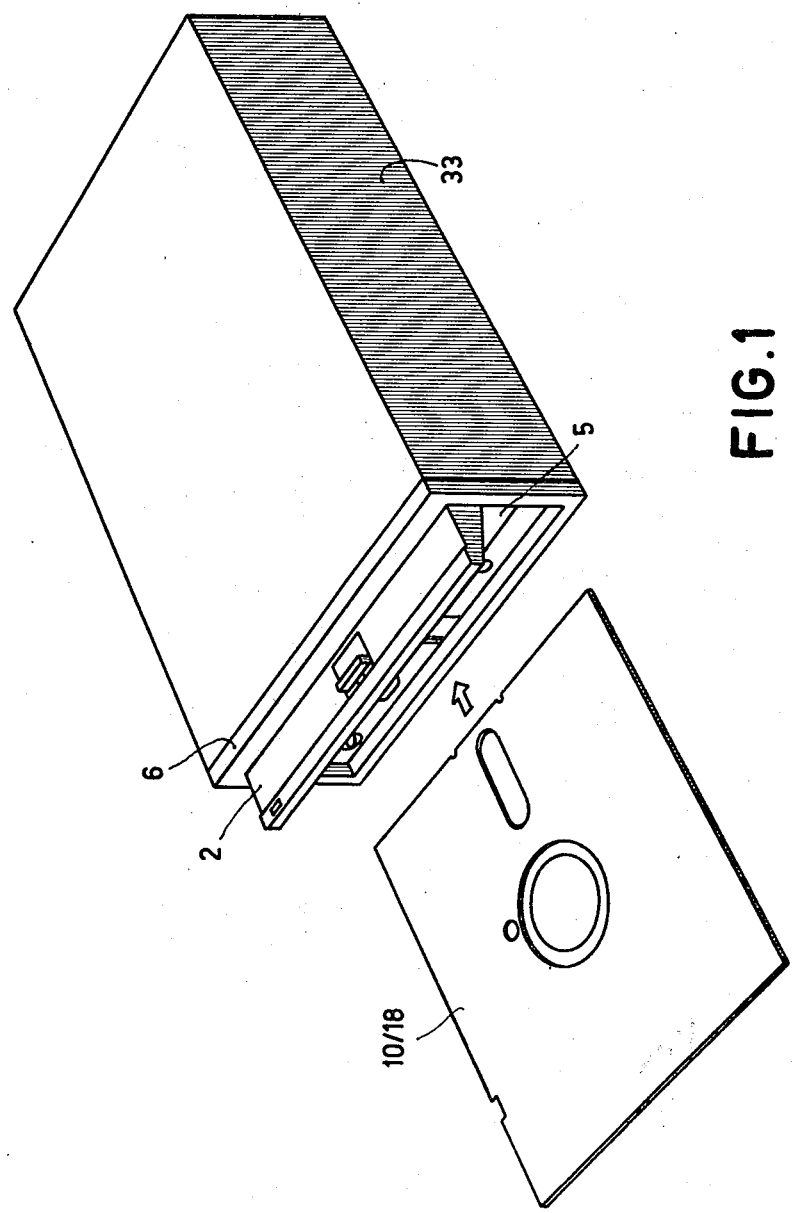

DRIVE APPARATUS FOR FLEXIBLE MAGNETIC DISCS

BACKGROUND OF THE INVENTION

1. Field of the Invention

The present invention generally relates to magnetic recording/reproducing apparatus and, more particularly, to a disc drive apparatus for use in recording data on a flexible magnetic disc and/or reproducing data recorded on such a disc.

2. Description of the Prior Art

A typical conventional disc drive apparatus consists of a drive mechanism, a read/write head, a track positioning mechanism, and a means for loading a disc on the drive mechanism and into engagement with the read/write head.

The loading means generally consists of a vertically moving frame, and a clamping member rotatably secured to the frame.

When such a frame is in an upper position, a flexible disc can be placed on a drive mechanism through an opening in a front portion of a housing. After the disc has been placed on the drive mechanism, the frame is moved to a lower position. As a result, the disc is ready to be driven by the drive mechanism, and a read/write head comes into contact with the magnetized surface of the disc.

When a flexible disc is placed on the drive mechanism by such a loading means as mentioned above, the disc itself or an envelope for the flexible disc sometimes collides with the upper surface of the read/write head and may thus damage the head.

After a flexible disc has been placed on the drive mechanism, the read/write head is constantly in sliding contact with the magnetic surface of the disc so that the read/write head and disc may be worn prematurely.

Prior art apparatus of this kind are disclosed in U.S. Pat. No. 4,040,106 entitled "Flexible Magnetic Disc Drive Apparatus" of Harold C. Medley; U.S. Pat. No. 4,040,107 entitled "Disc Positioning and Ejection Device in Disc Drive" of Philip S. Bryer; U.S. Pat. No. 4,024,581 entitled "Apparatus for Writing on and/or Reading Magnetic Discs" of Piercarlo Lesca; and U.S. Pat. No. 4,139,876 entitled "Record Ejecting and Positioning Assembly" of William M. Owens.

SUMMARY OF THE INVENTION

An object of the present invention is to provide a disc drive apparatus having a loading means preventing a disc and a read/write head from colliding when the flexible disc is inserted into the apparatus.

Another object of the present invention is to provide a disc drive apparatus which maintains the read/write head out of contact with flexible disc when the disc is being rotated by a disc drive mechanism, unless a drive signal exists.

Still another object of the present invention is to provide a disc drive apparatus of small dimensions which can be produced at a low cost and which has a high capacity.

To these ends, the present invention provides a disc drive apparatus for recording data on a flexible magnetic disc and/or reproducing data recorded on such a disc, comprising:

a spindle rotatably provided in a housing so as to rotate a disc;

a clamping member engageable with and disengageable from the spindle and permitting the disc to be rotated when the clamping member is in engagement with the spindle;

an arm member for rotatably supporting the clamping member and engaging or disengaging the clamping member with or from the spindle;

a positioning means operated in accordance with movements of the arm member;

an actuator including a solenoid, which actuator can be moved between first and second positions by the positioning means, and between second and third positions by the solenoid;

a carriage movable in the direction of the radius of the disc; and a head support means provided on the carriage so as to retain a magnetic head, which head support means can be displaced in accordance with the movements of the actuator so as to move the magnetic head to a position where the magnetic head is away from the disc when the actuator is in the first position, a position where the magnetic head is close to the disc when the actuator is in the second position, and a position where the magnetic head is in contact with the disc when the actuator is in the third position.

The above and other objects as well as advantageous features of the invention will become clear from the following description of a preferred embodiment taken in conjunction with the accompanying drawings.

BRIEF DESCRIPTION OF THE DRAWINGS

FIG. 12 is a perspective view illustrating the relation between the movable member and slide element of the embodiment shown in FIG. 1;

FIGS. 13A-13D are side elevational views of a disc ejection mechanism of the embodiment of the present invention, which illustrate a series of actions thereof;

FIGS. 14A-14C are slide elevational views of a head support means of the embodiment shown in FIG. 1, which illustrate a series of actions thereof;

FIGS. 14A'-14C' are front elevational views of the head support means shown in FIGS. 14A-14C, which illustrate the operational relation between the head support means and movable member; and FIG. 15 is a plan view of a flexible floppy disc cartridge.

DESCRIPTION OF PREFERRED EMBODIMENT

Figure 2:
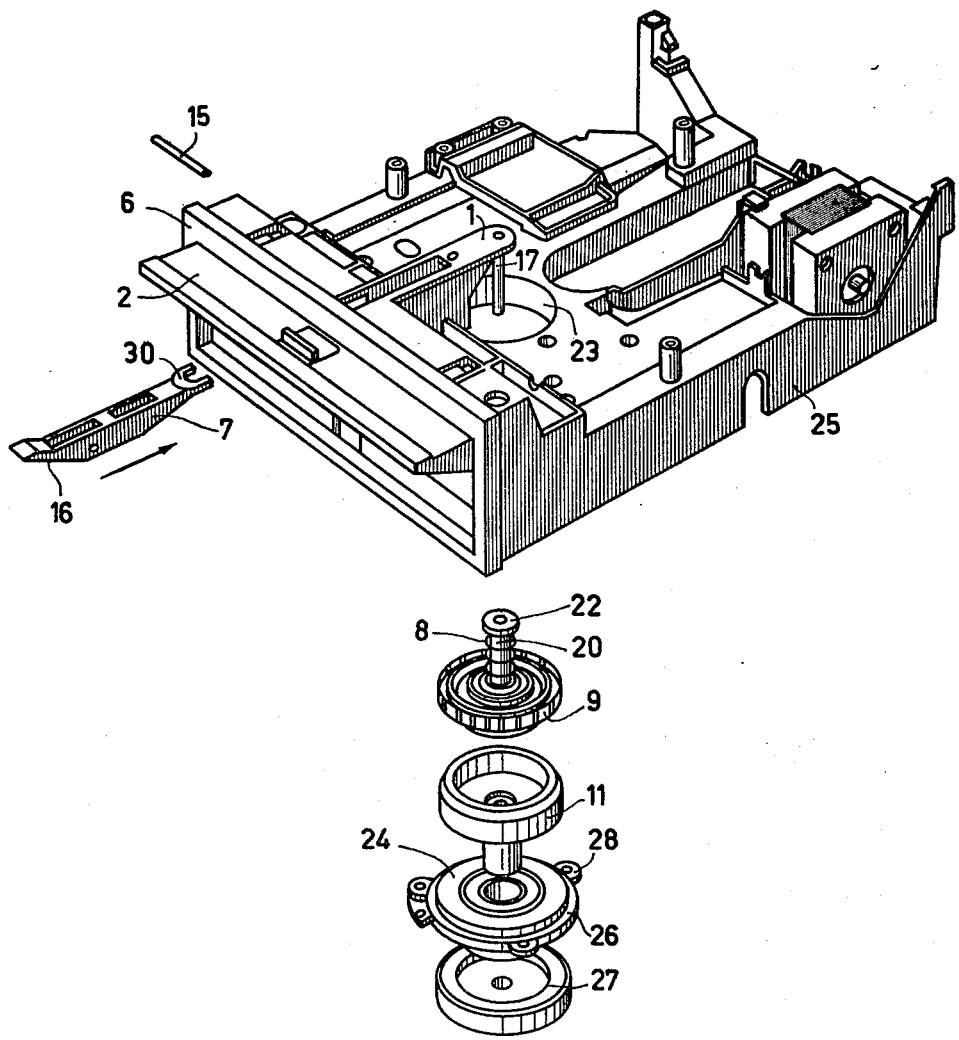
FIG. 2 is a perspective view of the embodiment shown in FIG. 1, with an upper cover removed so that the interior of the embodiment can be seen.

An embodiment of the present invention will be described with reference to the accompanying drawings.

Reference numeral 1 denotes a front panel made from a resilient synthetic resin and secured to a generally rectangular frame 2. A base plate 3 is secured to the sidewalls of the frame 2 at a location generally midway between the top and bottom thereof so as to divide the interior of the frame 2 into an upper chamber $4_1$ and a lower chamber $4_2$.

Fitted within each chamber is a respective lever $5_1$ and $5_2$ each generally U-shaped and consisting of a plate 7 extending behind the front panel 1 and two side arms 6a and 6b extending along opposing sidewalls of the frame 2. The side arms are each supported rotatably about respective shafts 8 fixed to the sidewalls of the frame 2. As illustrated clearly in FIG. 4, the levers 5 are each constantly urged away from the base plate 3 by resepective springs 9.

Reference numerals $10_1$ and $10_2$ denote door members each disposed in front of the front panel 1 and having a respective control element 11 projecting forwardly. Each door member 10 is connected to the projections 7a extending from a respective one of the plates in a manner allowing the lever 5 to be moved vertically. As the door members 10 are moved vertically away from the center of the front panel 1, they uncover a respective opening 1a through which a disc cartridge may be inserted, and adjacent openings 1b within which the projections 7a may travel.

Figures 8, 9:
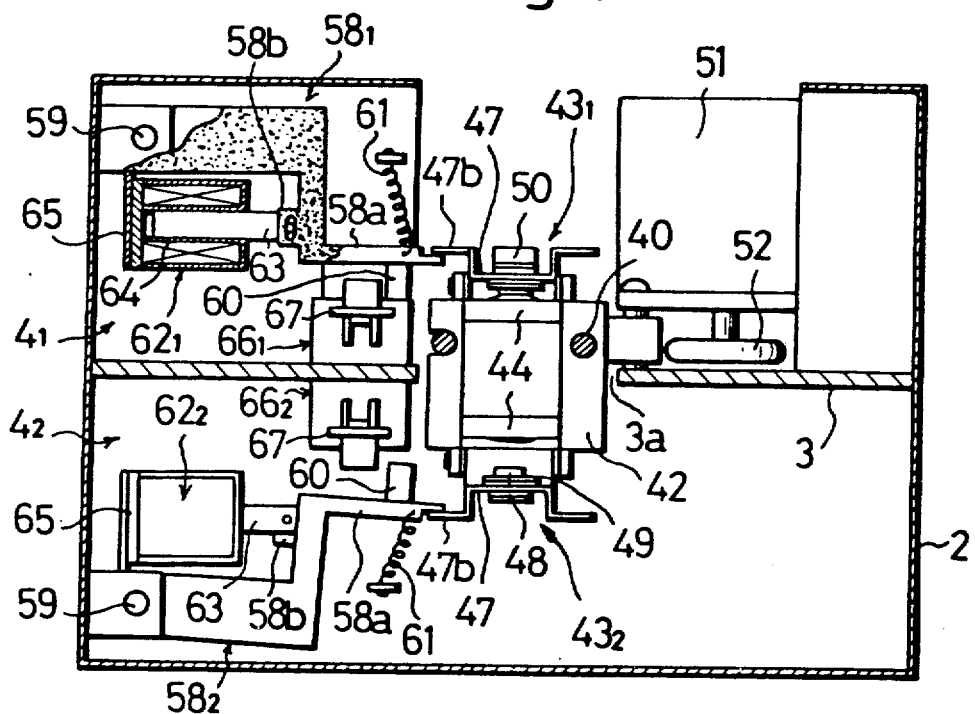
FIG. 8 is a front elevational view in section of the embodiment shown in FIG. 1, which illustrates the relation between the movable member and slide element.
FIG. 9 is an exploded view in perspective of a structure for locking a door of the embodiment shown in FIG. 1.
Figure 10:
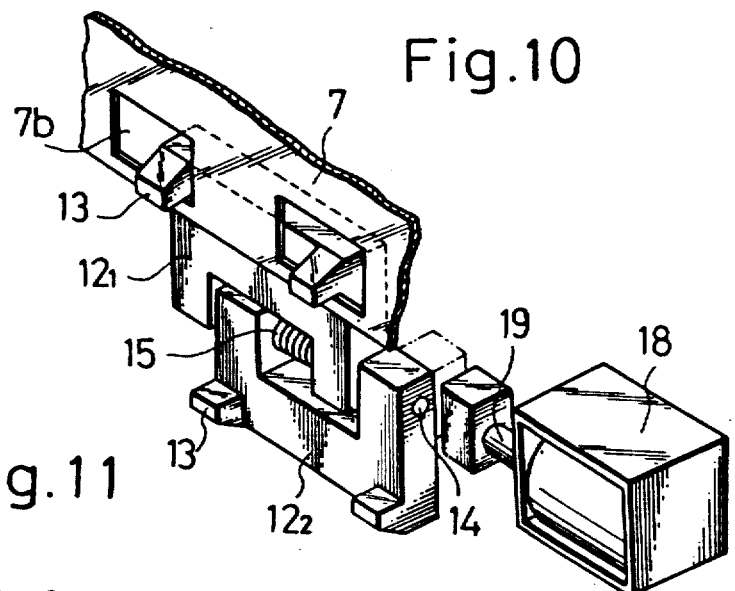
FIG. 10 is a perspective view of a safety device for the door locking structure in the embodiment shown in FIG. 9.

Reference numerals $12_1$ and $12_2$ denote a pair of locking members illustrated in FIGS. 9 and 10. The locking members are secured to a mounting portion 1c of the front panel 1 so they can be rotated about a support shaft 14. The locking members each include pawls 13 urged toward the front panel 1 by a spring 15 provided on the support shaft 14.

The pawls 13 of locking member $12_1$ are engageable with and disengageable from openings 7b formed in the locking plate 7 of the upper level $5_1$, while the pawls 13 of the other locking member $12_2$ are engageable with and disengageable from the openings 7b in the plate 7 of the lower lever $5_2$. Thus, the levers 5 and door members 10 connected therewith are locked in a position blocking access to the respective opening 1a or released to a position allowing access thereto.

Figure 5:
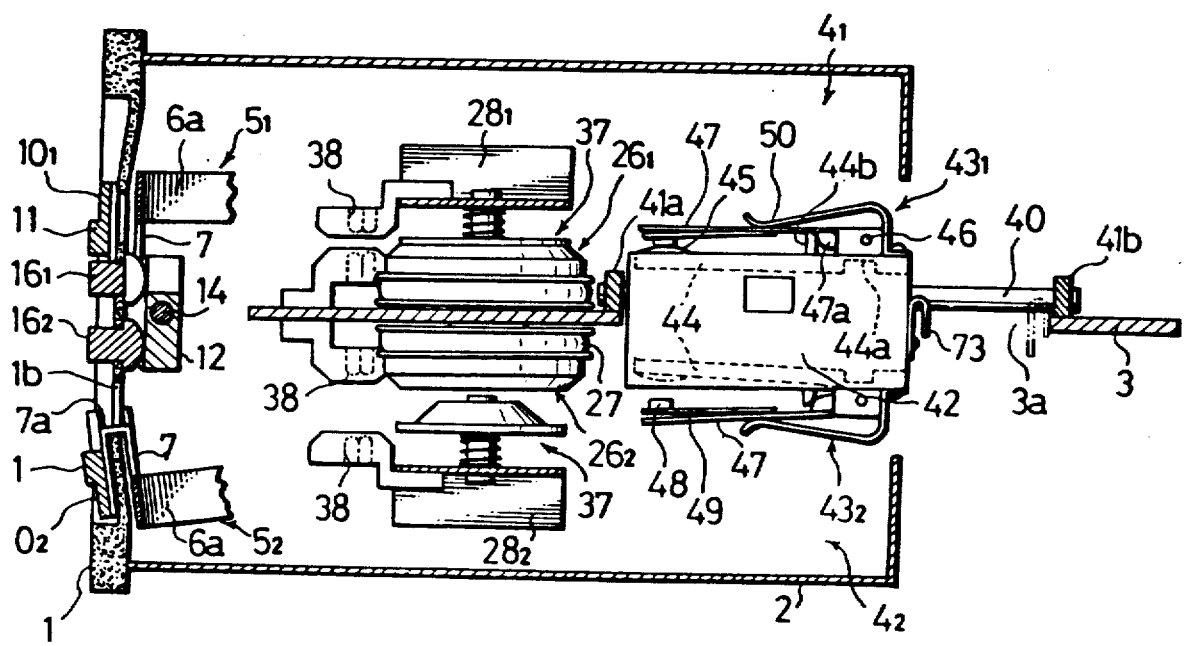
FIG. 5 is a side elevational view of the embodiment shown in FIG. 1, which illustrates the actions of a carriage supporting a read/write head, and a spindle chuck.

Reference numerals $16_1$ and $16_2$ denote, as may be noted from FIG. 5, a pair of ejection buttons provided in the front panel 1. One of the ejection buttons is opposed to one locking member $12_1$. When this ejection button $16_1$ is depressed, the locking member $12_1$ is rotated so as to release its pawls 13 from the openings 7a in the associated plate 7. The other ejection button $16_2$ permits rotation of the other locking member $12_2$, which can thus release the associated plate 7 in the same manner. Each of the ejection buttons is provided with a lamp 17, which is lit only while the disc drive apparatus is in operation, to indicate that the apparatus is being operated.

Figure 3:
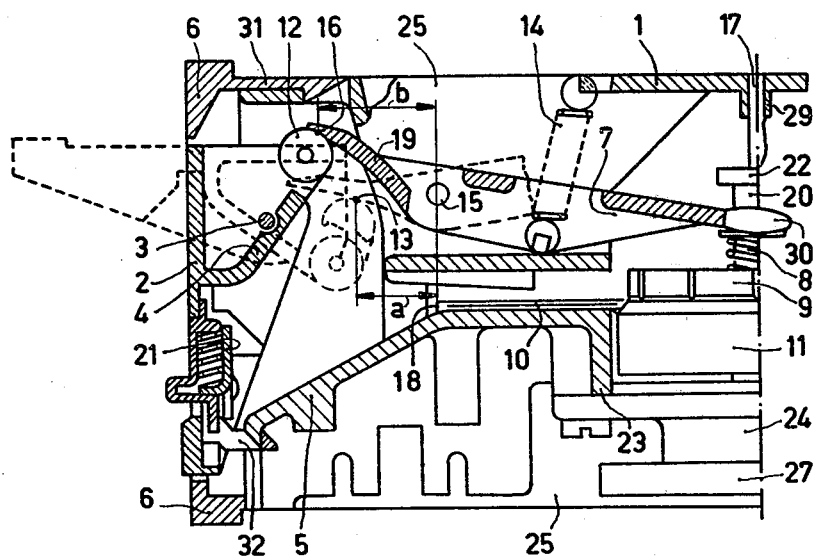
FIG. 3 is a top elevational view of the embodiment shown in FIG. 2.

Reference numerals $18_1$ and $18_2$ denote a respective one of a pair of solenoids fixed to the base plate 3 in a location near a respective locking member $12_1$ or $12_2$, as shown in FIG. 3. Each of the solenoids has a self-returning plunger 19. These plungers 19 are normally in positions away from the rear surface of the adjacent locking members. When the disc drive apparatus is actuated, the solenoids 18 can be operated with a signal to allow the plungers 19 to be extended behind the rear surface of the respective locking member 12. Accordingly, should an ejection button 16 be depressed inadvertently during operation of the disc drive apparatus, the rotation of the associated locking member 12 is prevented so that disc cartridges 20 cannot be discharged, as will be set forth below.

The disc cartridge 20, which is shown in FIG. 15, contains a flexible magnetic disc 21 housing in a cartridge 22. Generally, the cartridge is provided in both upper and lower walls thereof with a central opening 22a concentric with and greater in diameter than the central opening 21a of the disc 21 to allow a central annular portion 21b of the disc 21 to be exposed.

The cartridge 22 is further provided in the opposite portions of the upper and lower walls thereof with an elongated elliptic opening 22b exposing a radial section of the disc 21. While the disc 21 is rotated, a magnetic head, which will be described later, can be brought close to the tracks appearing in the elliptic opening 22b.

The cartridge 22 is further provided in the opposite portions of the upper and lower walls thereof with small openings 22c which are utilized to detect index information on the rotating disc 21.

Figure 7:
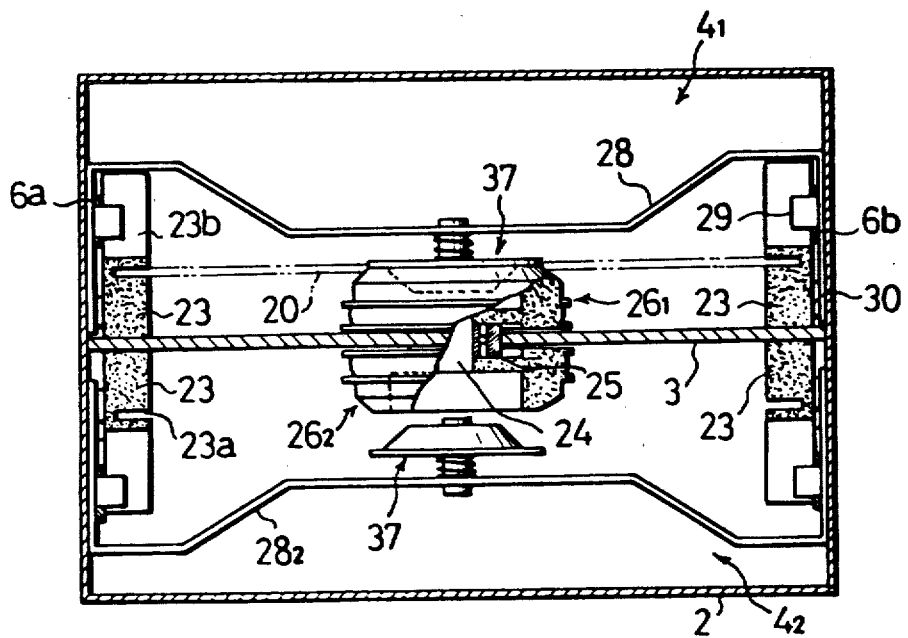
FIG. 7 is a front elevational view in section of the embodiment shown in FIG. 1, which illustrates a loading mechanism and a guide member.
Figure 11:
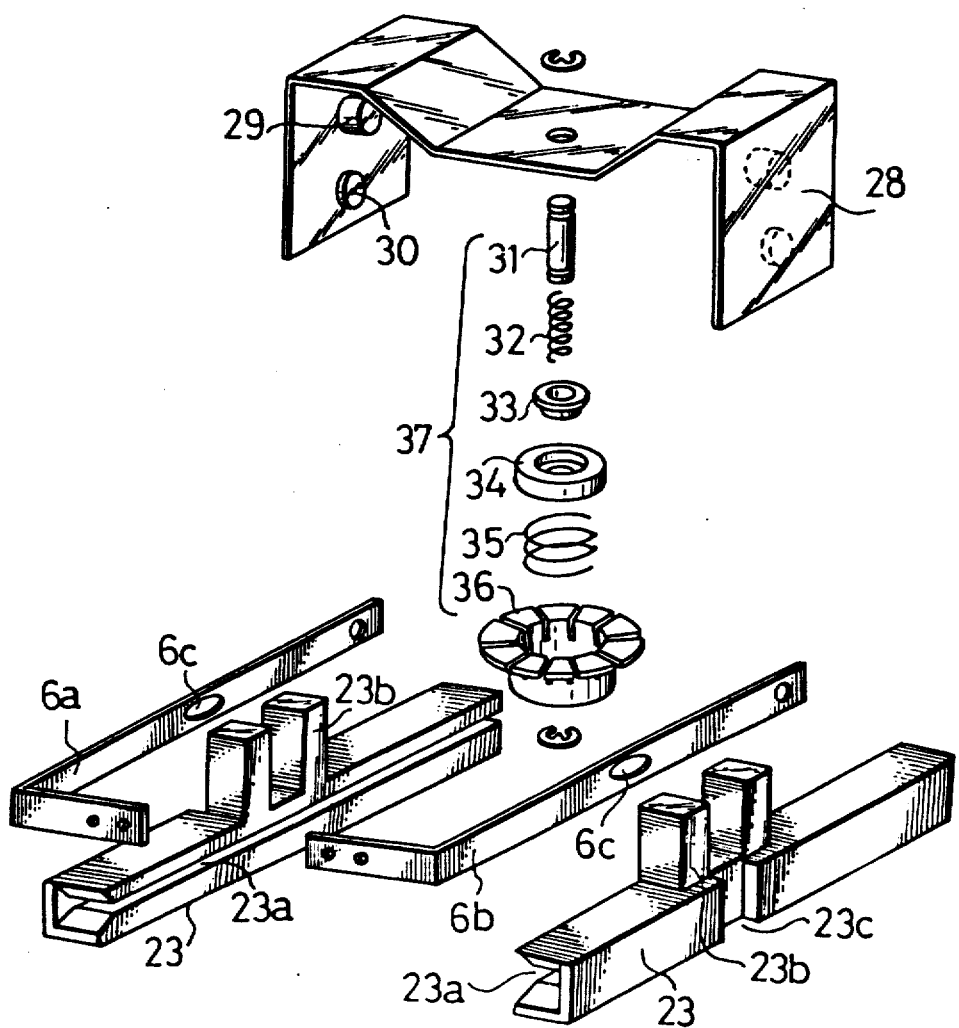
FIG. 11 is a perspective view of a loading mechanism in the embodiment shown in FIG. 1.

Fixed in space relation to the inner sidewalls of the frame 2 are guide members 23 for guiding the disc cartridge, as can be seen in FIG. 7. The guide members 23 are provided as opposing pairs in each of the chambers $4_1$, $4_2$ so as to direct the disc cartridge 20 being inserted within the respective chamber. Each of the guide members 23 is provided, as shown in FIG. 11, with an elongate guide recess 23a; a pair of spaced projections 23b extending away from the base plate 3, and a recess 23c formed on the side adjacent the respective sidewall of the frame 2.

As shown in FIG. 7, a shaft 24 is rotatably fixed to the base plate 3 via ball bearings 25, and spindle chucks $26_1$ and $26_2$ are mounted fixedly on respective end portions of the shaft 24. The spindle chucks $26_1$ and $26_2$ are each provided with a respective pulley 27 integrally formed therewith, and are positioned within respective chambers $4_1$ or $4_2$ inside the frame 2.

Reference numerals $28_1$ and $28_2$ denote generally M-shaped collet holders disposed respectively in the chambers $4_1$ and $4_2$ as shown in FIG. 7. The collet holders each include a central portion extending towards the base plate 3 and end portions having pins 29 and 30 secured to the inner surface thereof as shown in FIG. 11. The collet holders 28 are further provided, as may be noted from FIG. 11, with a disc holding mechanism 37 in the central portion thereof. The disc holding mechanism 37 consists of a support shaft 31 having a spring 32 therearound, a flanged bearing 33, a bearing mounting ring 34, a spring 35 and a collet or a spindle-clamping member 36 fitted in the mentioned order, and E-shaped locking washers fitted around the end portions of the support shaft 31.

The pins 30 are positioned in the recesses 23c provided in the rear surface of the guide member 23, while the pins 29 are passed through elliptic openings 6c in side arms 6a and 6b of the levers 5 and positioned between a pair of projections 23b of the guide member 23.

When a lever 5 is vertically moved in accordance with the vertical movements of the associated door member 10, the collet holder 28 is linearly moved in the vertical direction away from the respective spindle chucks 26 as the pins 29 and 30 are guided by the projections 23b and recess 23c, respectively. As a result, the collets 36 of the disc holding mechanism 37 can be brought into engagement with and out of engagement from the respective spindle chucks 26.

Reference numeral 38 denotes as may be noted from FIG. 5, a plurality of detection members provided both on the base plate 3 and the collet holders so as to detect index information on the disc. A switch 39 is provided for detecting allowable and not allowable writing onto the disc at the time of insertion of the disc cartridge, as can be seen in FIG. 3. Also, a pair of guide rods 40 are connected to the base plate 3 via mounts 41a and 41b and a carriage 42 made from an insulating material is disposed movably on the guide rods 40. The carriage 42 is positioned in an opening 3a of the base plate 3 and extends into both chambers $4_1$ and $4_2$.

The carriage 42 carries head mechanisms $43_1$ and $43_2$ each adapted to be disposed in a respective chamber $4_1$ or $4_2$. Each of the head mechanisms is shown in FIGS. 5 and 14 and consists of a retainer 44 fixed to the carriage 42 and having an elastic portion 44a and a cam portion 44b. A read/write head 45 is carried by the retainer 44 and a head holder 47 is rotatably connected to the carriage 42 via a support shaft 46. The head holder 47 has a cam 47a cooperating with the cam portion 44b of the retainer 44 and an elastic plate 49 carrying a read/write head 48 opposed to the read/write head 45 is fixed to the head holder 47. A spring 50 is fixed to the carriage 42 and constantly urges the head holder 47 toward the carriage 42.

When the disc cartridge 20 is inserted, the heads 45 and 48 are in a position which are away from the path of movement of the disc cartridge due to the cam 47a engaging cam portion 44b to separate the heads 45 and 48. The driving of the head mechanism 43 will be described later.

Figure 4:
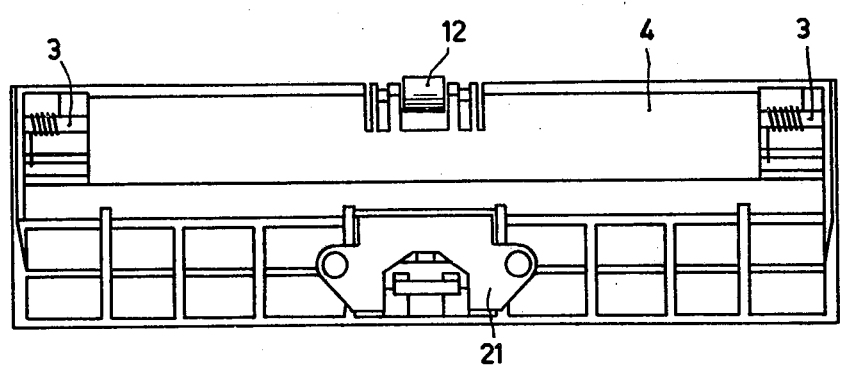
FIG. 4 is a side elevational view of the embodiment shown in FIG. 1, which illustrates the action of various part at the time of insertion of a disc.
Figure 1:
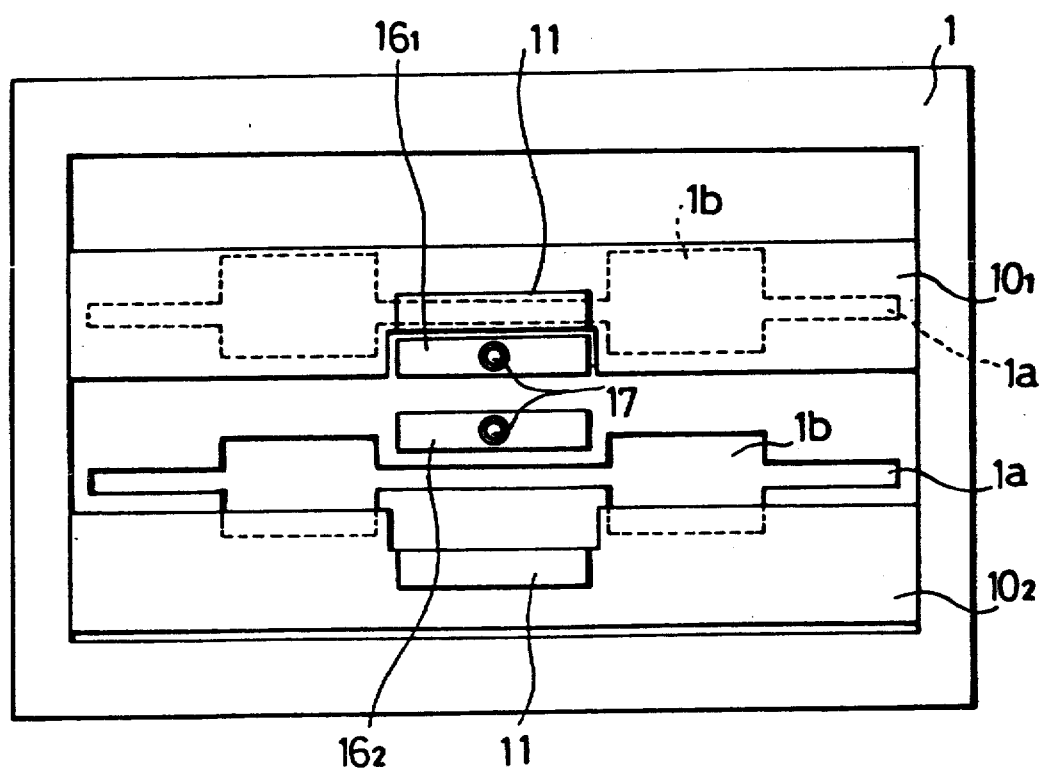
FIG. 1 is a plan view of the front of a disc drive apparatus embodying the present invention.
Figure 3:
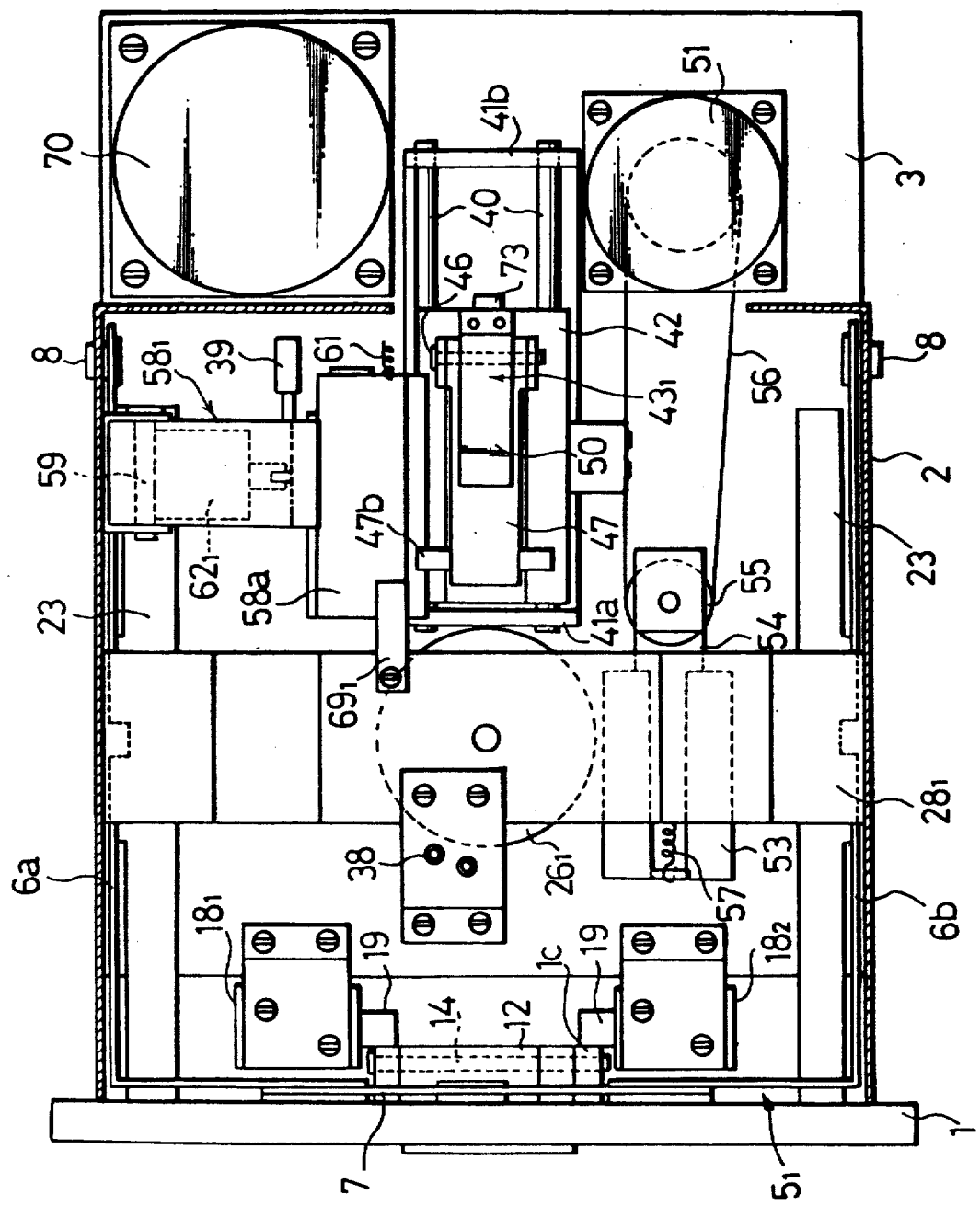
Figure 4:
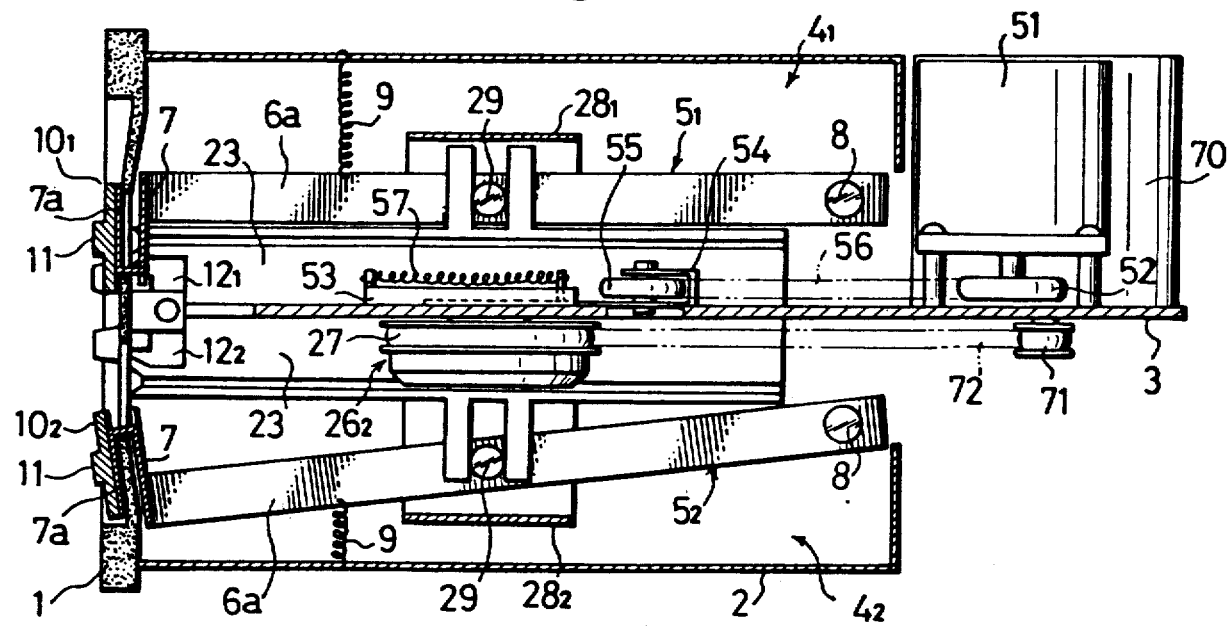

Reference numeral 51 denotes a step motor mounted to the base plate 3 and provided with a pulley 52 for use in driving the carriage 42. Support members 53 are fixed to the upper surface of the base plate 3 and a movable element 54 having a pulley 55 is slidable along the upper surface of the base plate 3, as can be seen in FIG. 4. A belt 56 made of steel is wrapped around the pulley 55 and the pulley 52. The belt 56 is constantly tensed by a tension spring 57 extending between the movable element 54 and support member, so that the movable element 54 is slidably supported between the support members 53. The belt 56 is operatively connected to the carriage 42 so that the carriage 42 can be moved in accordance with the movements of the belt 56.

Figure 6:
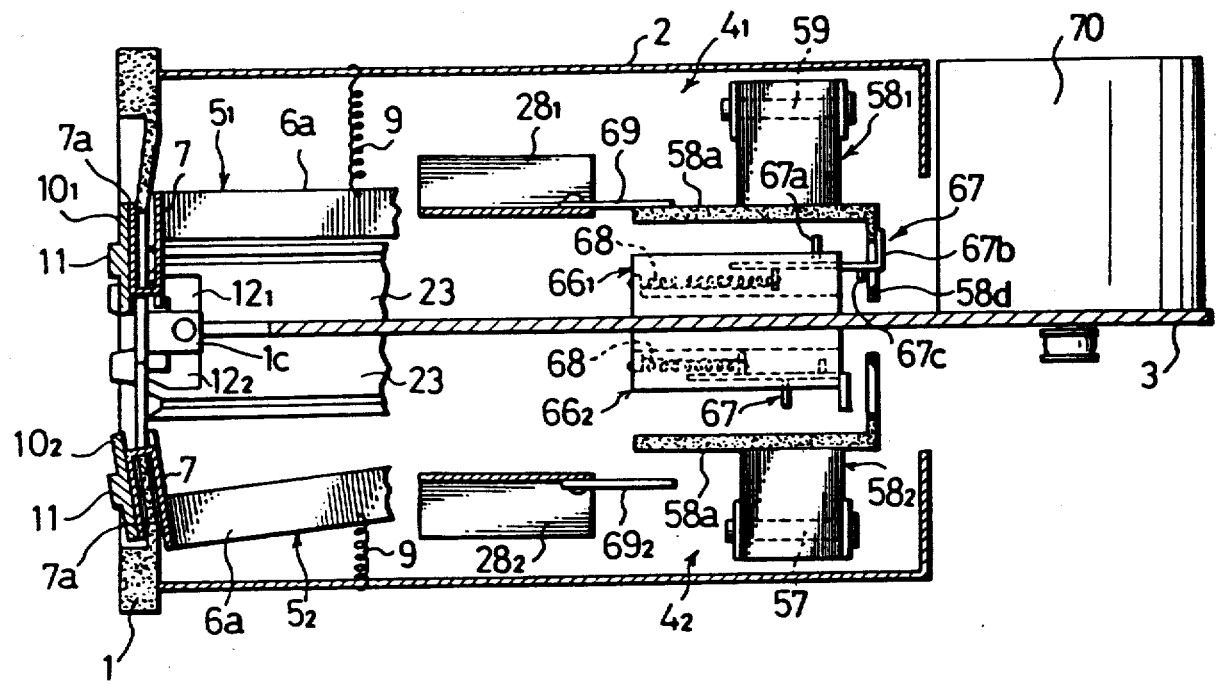
FIG. 6 is a side elevational view of the embodiment shown in FIG. 1, which illustrates the relation between a movable member and a slide element.

Reference numerals $58_1$ and $58_2$ denote, as shown in FIG. 6, actuators disposed respectively in the chambers $4_1$ and $4_2$ and adapted to move the respective head mechanisms $43_1$ and $43_2$. The actuators $58_1$ and $58_2$ are movably secured to the frame 2 via support shafts 59 and are each provided with a pad 60 on the lower surface of a flat horizontal portion 58a thereof, whereby the disc cartridge 20 can be pressed gently, as will be set forth below. Springs 61 are provided between the flat portions 58a and the frame 2 so as to draw the actuators away from the base plate 3. Projections 47b extending from the head holders 47 are engaged respectively with a stepped flange on the respective flat portion 58a, as can be seen in FIGS. 2 and 9, to maintain the holders in a lifted condition.

Reference numerals $62_1$ and $62_2$ as may be noted from FIG. 8 denote solenoids provided for the actuators $58_1$ and $58_2$. Plungers 63 of the solenoids are joined to projected portions 58b of the respective actuator 58 so that the actuator can be moved in accordance with the movements of respective plunger. The plungers 63 are each retained at a high precision by a retainer member 64 provided in the central portion of the respective solenoid 62. A packing 65 made of rubber, etc. is provided at one end of the respective solenoid 62 so as to keep the interior of the retainer member 64 in a sealed state.

When the solenoid 62 is actuated so that the plunger 63 is energized to be moved toward the packing 65, the sealed interior of the retainer member 64 functions as a damper mechanism. As a result, the plunger 63 can be prevented from being rapidly moved.

As may be understood from FIGS. 6 and 12, reference numerals $66_1$ and $66_2$ denote slide retainer members fixed to the base plate 3 such that they are opposed to the flat portions 58a of a respective actuators $58_1$ or $58_2$. Slide members 67 are slidably held by respective slide retainer members $66_1$ and $66_2$ and constantly drawn toward the front panel 1 by respective springs 68 provided between the slide members 67 and the front wall of slide retainer members 66.

The slide member 67 has an upstanding projection 67a engageable with the disc cartridge 20, as will be set forth below, a larger upstanding projection 67b spaced from the projection 67a, and a smaller projection 67c provided between the projection 67a and larger projection 67b but extending in a direction opposite to the direction in which the larger projection extends. The smaller projection 67c and larger projection 67b are, as will be described later, engageable with and disengageable from engagement portions 58a having holes 58c and formed on the flat portions 58a of the actuators $58_1$ and $58_2$.

Reference numerals $69_1$ and $69_2$ denote stoppers attached to respective collet holders. The stoppers serve to move the actuators $58_1$ and $58_2$ against the force of the springs 61, and serve to hold the flat portions 58a of the actuators in a predetermined position when the disc drive apparatus is not in operation.

Reference numeral 70 denotes a motor provided next to the step motor 51, and serves to drive the disc 21. A pulley 71 is provided on the motor 70 and a belt 72 is wrapped around the pulley 71 and the pulley 27 connected to the spindle chuck $26_2$. When the motor 70 is in motion, both of the spindle chucks $26_1$ and $26_2$ are simultaneously rotated via the belt 72.

Reference numeral 73 denotes, as may be understood from FIG. 5, a U-shaped metallic plate spring attached to one end of the carriage 42. This plate spring 73 is in an electrically insulated condition since it is mounted on the carriage 42 which is made of an insulating material. When the carriage is moved away from the spindle chuck 26, the plate spring 73 comes into contact with the base plate 3, which consists of a metal plate and serves as a ground. At this time, a zero-track of the disc 21 is detected.

The operation of a disc drive apparatus according to the present invention will be described below.

When an opening 1a in a front panel 1 is uncovered for inserting a disc cartridge by depressing an ejection button 16 to move an associated door member, lever 5 is drawn by spring 9 away from the base plate 3, and a disc holding mechanism 37 provided on a collet holder 28 is drawn to a position away from its associated spindle chuck 26, so that a disc cartridge 20 can be inserted. Further, a flat portion 58a of an actuator 58 is held in a position away from the associated slide retainer member 66 due to the force of a spring 61, and is engaged with a projection 47b of a head holder 47 so that it is in a raised state.

At this time, the cam 47a of the head holder 47 and the cam portion 44b of the retainer 44 cooperate (are engaged) with each other as shown in FIGS. 14A and 14A' so that heads 45 and 48 provided on the head holder 47 and retainer 44 are held out of the passage for the insertion and withdrawal of a disc cartridge 20. Moreover, a motor 70 is functioning since it has been connected to a power source, and both of the spindle chucks $26_1$ and $26_2$ are thus being rotated via the belt 72.

When the disc cartridge 20 is then inserted through an opening 1a in the front panel 1, the cartridge 20 advances in the frame 2 as it is guided by recesses 23a in a pair of guide members 23. the cartridge 20 then impinges at its forward end upon a projection 67a of a slide member 67, as shown in FIG. 13A, to move the slide member against the resilience of a spring 68.

As the slider member 67 is moved by the advancing disc cartridge, a larger projection 67b provided on the slide member 67 passes through a hole 58c in an engagement portion 58d of an actuator 58, while a smaller projection 67c impinges upon an inclined surface 58e on the lower side of the hole 58c to move the engagement portion 58d in the direction against the spring 61. When the smaller projection has passed through the hole 58c, the engagement portion 58d is returned a little by the spring 61, and the smaller projection 67c is locked by the engagement portion 58d as shown in FIG. 13B. This completes insertion of the disc cartridge.

At the time of insertion of the disc cartridge, the heads 45 and 48 are in a position outside the path of movement of the cartridge so that the heads 45 and 48 cannot be damaged by collision with the disc cartridge. In addition, the flat portion 58a of the actuator 58, the disc holding mechanism 37 and the pad 60 are also outside the path of movement for the cartridge so that the cartridge can readily be inserted.

When a control element 11 provided in the door member 10 is pressed toward the adjacent ejection button 16 after the insertion of the disc cartridge has been completed, the lever 5 is rotated about its fulcrum provided by the support shaft 8 against the force of the spring 9 and the door member again covers the opening 16. An opening 7b of a plate 7 then becomes aligned with a pawl 13 of the locking member 12 and the locking member is returned to the original position by the force of the spring 15. The pawl 13 then comes into engagement with the opening 7b to thereby lock the door member 10 in position. A collet holder 28 with the disc holding mechanism 37 is moved toward the spindle chuck 26 by a pin 29 in engagement with an elliptic hole 6c in the lever 5 as it is returned to its original position.

In accordance with the movement of the collet holder 28, the stopper 69 associated therewith is moved toward the base plate 3 and engages the flat portion 58a of the actuator 58. The flat portion 58a is thus pushed toward the base plate 3 against the force of the spring 61.

When the smaller projection 67c of the slide member 67, which is engaged with the engagement portion 58d as shown in FIG. 13B, comes into alignment with the hole 58c, the smaller projection 67c is disengaged and the slide member begins to return to its initial position due to the force of the spring 68. During the return action of the slide member, the larger projection 67b is moved into engagement with the upper border of the hole 58c, as shown in FIG. 13C. The slide member 67, and the disc cartridge abutting against projection 67a, are thus returned a small extend by the force of the spring 68.

As the lever 5 returns to its initial position, the collet holder 28 is linearly moved toward the spindle chuck 26 as the pins 29 and 30 are guided by the projections 23b and recess 23c, respectively, so that the disc 20 is rotated as it is held at its central annular portion 21b between a collet 36 a part of which is inserted into a central opening 21a of the disc 21 placed in a cartridge body 22, and the spindle chuck 26 which is rotated with the collet 36, as shown in FIG. 7. The movements of the stopper 69 and flat portion 58a are stopped when the collet 36 comes into engagement with the spindle chuck 26 to securely hold the disc 21.

As the stopper 69 moves the flat portion 58a, the head holder 47 engaged with the flat portion 58a is moved by the force of a spring 50.

Namely, the head holder 47 is rotated about its fulcrum, i.e. a support shaft 46, in the directions of solid arrows in FIG. 14. When the head holder 47 is moved by the stopper 69 and flat portion 58a, the cam 47a of the head holder 47 in engagement with the cam portion 44b of the retainer 44, as shown in FIG. 14A, is brought out of engagement therefrom as shown in FIG. 14B as the elastic retainer 44 deflects downwardly. At this time, the head 45 returned by an elastic portion 44a of the retainer 44 to come into contact with one side of the disc exposed from an elongated elliptic opening 22b provided in the cartridge body 22. The other head 48 is brought close to the other side of the disc 21 since the projection 47b of the head holder 47 is in engagement with the flat portion 58a.

Thus, the preparations for driving the disc are completed.

The activation of the head 45 will be described first.

When an activating signal is applied, a lamp 17 provided on an ejection button 16 is lit to indicate that a disc is in a driven state. A solenoid 18 which received the activating signal is also operated to extend plunger 19 toward the rear surface of a locking member 12 to prevent an ejection button 16 from rotating a locking member 12.

When a step signal is then applied, a step motor 51 is driven, and a carriage 42 is moved in the direction of the radius of the disc 21 to allow a head 45 to be placed in a predetermined position. When a head load signal is applied, a solenoid 62 is operated so that a plunger 63 thereof is retracted.

As a result, a flat portion 58a of the actuator 58 is moved toward a slide retainer member 66 as shown in FIG. 13D, and a pad 60 attached to the lower surface of the flat portion 58a causes the disc cartridge to be pressed securely against the slide retainer member 66 so that the head 45 contacts the disc 21 in a stable manner. At the same time, the flat portion 58a is moved so as to be disengaged from a projection 47b of a head holder 47. As a result, the head holder 47 comes to be in a free state so that a head 48 comes into contact with the disc 21 by the force of a spring 50.

A reference of a sector is detected with the head load signal by an index detection member 38 through small openings 22c, and reading or writing is conducted with respect to the disc 21 through the head 45.

When this head load signal is terminated, the solenoid 62 is de-energized, and the flat portion 58a of the actuator 58 is moved until the flat portion 58a has collided with a stopper 69 by the force of a spring 61, so that the disc cartridge 20 pressed by the pad 60 is released from the pressing force of the pad 60 as shown in FIG. 13C. At the same time, the flat portion 58a comes into engagement with the projection 47b of the head holder 47 so as to raise the head holder 47 as shown in FIGS. 14B, 14B'. The head 48 is then moved in the direction of broken arrows so that the head 48 in contact with the disc 21 is returned to a position where the head 48 is away from the disc 21.

When a step signal is applied again for reading and writing operations of the head 45, the head 45 is moved to a predetermined selected position on the basis of the principle described above, and the reading or writing is then conducted with a head load signal on the basis of the principle described above, by the head 45.

When the drive signal is stopped after the reading and writing have been finished, the solenoid 18 for actuating the locking member 12 is de-energized, and the plunger 19 is automatically returned or moved away from the rear surface of the locking member 12. As a result, the locking member 12 is ready to be rotated by the ejection button 16, and the lamp 17 on the ejection button 16 is turned off to indicate that the head 45 is not in operation.

A step motor 51 is then driven with a step signal to move the head 48 to a predetermined position via a belt 56 and a carriage 42, and the solenoid 62 is then energized with a head load signal so that a plunger 63 is again drawn to operate the actuator 58.

Accordingly, the flat portion 58a of the actuator 58 is moved toward the slide retainer member 66 so that the disc cartridge 20 is pressed against the slide retainer member 66 by the pad 60 attached to the lower surface of the flat portion 58a, to thereby allow the head 45 to contact the disc 21 in a stable manner.

When the flat portion 58a is moved as shown in FIGS. 14C and 14C', it comes out of engagement from the projection 47b of the head holder 47 so that the head holder is in a free state. As a result, the head 48 mounted on an elastic plate 49 comes into contact with the disc 21 by the force of the spring 50 so that the head 48 is in contact with the surface of the disc 21.

When the plunger 63 of the solenoid 62 is drawn before the head 48 comes into contact with the disc 21, the plunger 63 is moved to compress a cavity in a sealed state in the retainer member 64. Consequently, the speed of movement of the plunger 63 becomes low. This movement of the plunger 63 exerts influence upon the flat portion 58a and head holder 47 so that the head 48 comes into perfect contact with the disc 21 with a gradually increasing contact pressure without crashing thereinto.

A reference of sector is detected with a head load signal by an index detection member 38 to allow reading and writing operations to be conducted through the head 48.

When this head load signal is terminated, the solenoid 62 for use in operating the actuator 58 is de-energized so that the flat portion 58a of the actuator 58 is moved until it has collided with the stopper 69 by the force of a spring 61.

The disc cartridge 20 pressed by the pad 60 is released from the pressing force thereof as shown in FIG. 13C. In addition, the flat portion 58a comes into engagement with the projection 47b of the head holder 47 to raise the same and, therefore, the head 48 is moved in the direction of broken arrows as shown in FIGS. 14B, and 14B', so that the head 48 which has been in contact with the disc 21 is moved away therefrom.

When a step signal and a head load signal are applied for reading and writing operations of the head 48, such operations are carried out on the basis of the principle described above.

When a driving signal is terminated after these operations have been finished, the solenoid 18 is de-activated. As a result, the locking member 12 is rendered ready to be rotated by the ejection button 16, and the lamp 17 is turned off to indicate that the disc drive apparatus is not in operation.

In order to withdraw the disc cartridge 20, the ejection button 16 is depressed so that the pawl 13 is rotated against the force of a spring 15 so as to be disengaged from an opening 7b of the locking plate 7. When the pawl 13 has been disengaged from the opening 7b, a lever 5 is rotated about its fulcrum, i.e. a support shaft 8, by the force of a spring 9 in a direction in which the lever 5 is moved away from an ejection button 16, so that openings 1a in the front panel 1 are uncovered. When the lever 5 is rotated, a pin 29 comes into engagement with an elliptic opening 6c in the lever 5, and a collet holder 28 with a disc holding mechanism 37 is thereby moved away from a spindle chuck 26.

Pins 29 and 30 of the collet holder 28 are at this time moved linearly as they are guided by projections 23b and a recess 23c on and in a guide member 23 so that the disc 21 is released from a collet 36 and spindle chuck 26. As a result, the collet holder 28 and disc holding mechanism are returned to the original position.

When the collet holder 28 is moved, the stopper 69 is also moved together and, consequently, the flat portion 58a of the actuator 58 is moved away from the slide retainer member 66 by the force of a spring 61 in accordance with the movement of the stopper. The flat portion 58a is then stopped in a predetermined position to restore the original condition.

When the flat portion 58a is further moved to allow a larger projection 67b of a slide member 67 to be aligned with an opening 58c in an engagement portion 58d of the actuator 58, the larger projection 67b which is engaged with the engagement portion 58d as shown in FIG. 13C comes out of engagement therefrom, and the slide member 67 is moved backwardly toward the front panel 1 by the force of a spring 68.

While the slide member 67 is moved toward the front panel 1, the disc cartridge 20 is pushed by a projection 67a and discharged. Thus, the cartridge 20 is ready to be withdrawn from the opening 1a in the front panel 1.

When the flat portion 58a of the actuator 58 is moved toward the head holder 47, the latter is raised against the force of the spring 50. As a result, the head holder 47 is rotated to allow a cam 47a to be engaged with a cam portion 44b as shown in FIGS. 14A and 14B, and an elastic portion 44a of the retainer member 44 is bent. At this time, the head 45 is moved outside the passage for the insertion and withdrawal of the disc cartridge 20, and the head 48 on the head holder 47 is also moved outside the same passage.

The insertion and withdrawal of disc cartridge 20 and the actuation and the stopping of a disc drive apparatus and conducted in the above-described manner.

The above description is directed to a disc drive apparatus according to the present invention with one disc cartridge inserted therein. However, a disc drive apparatus according to the present invention permits inserting two disc cartridges 20 at once. Namely, an apparatus according to the present invention is of two-medium type having a large memory capacity which permits rotating two discs 21 simultaneously by one drive motor 70, and bringing one carriage 42 close to two head mechanisms 43 by one step motor 51.

The present invention is not, of course, limited to the above embodiment; it can be modified in various ways within the scope of the appended claims.

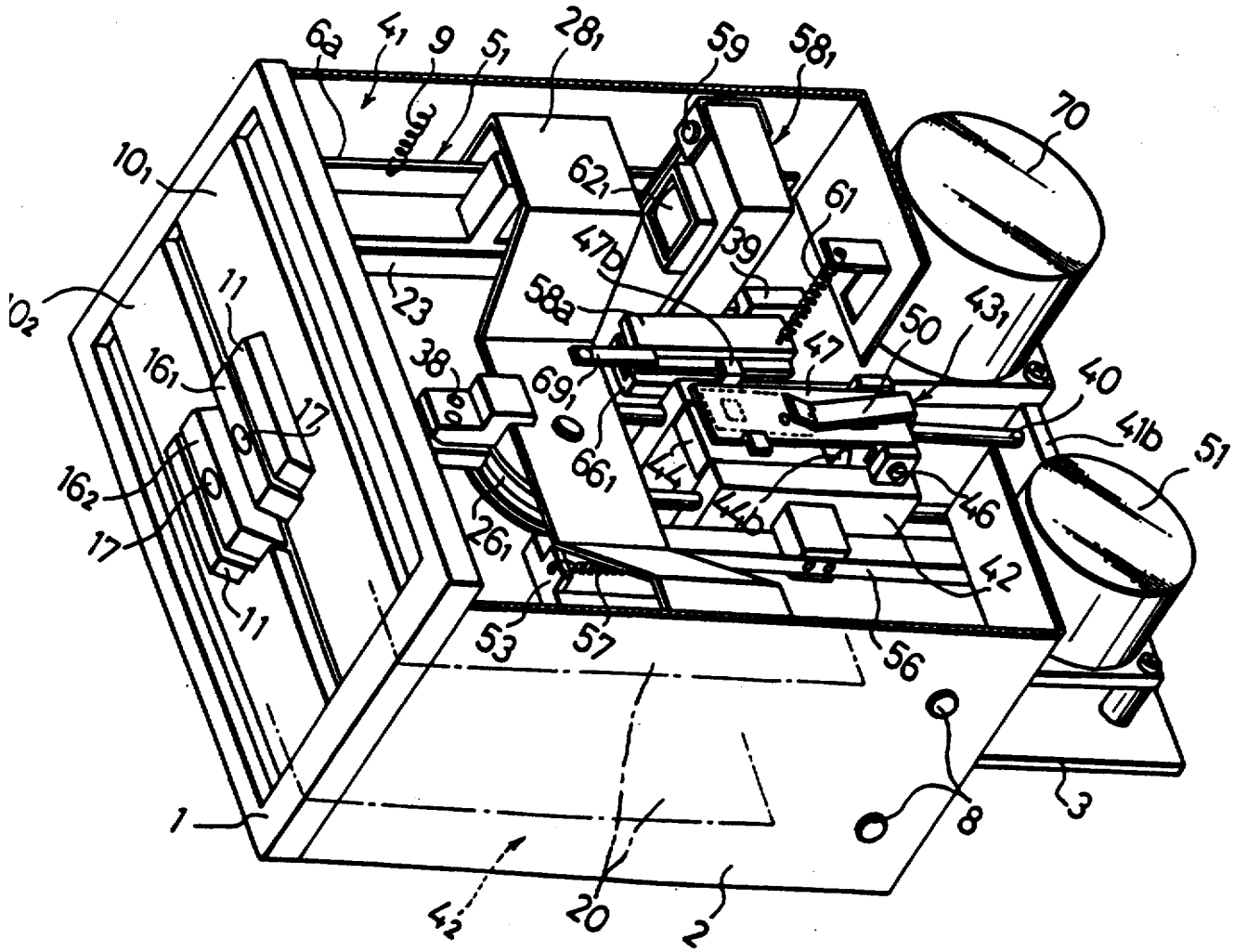

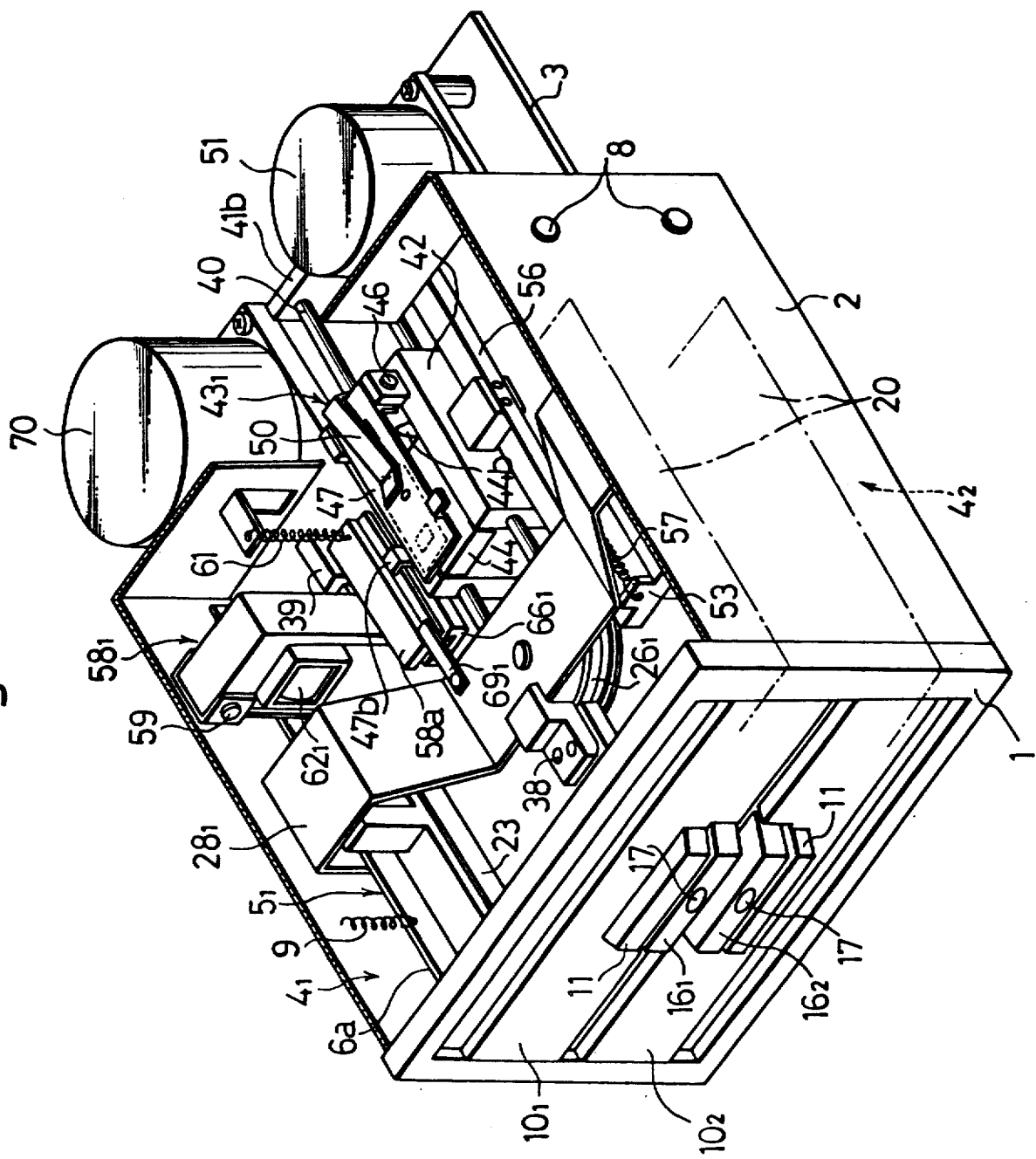

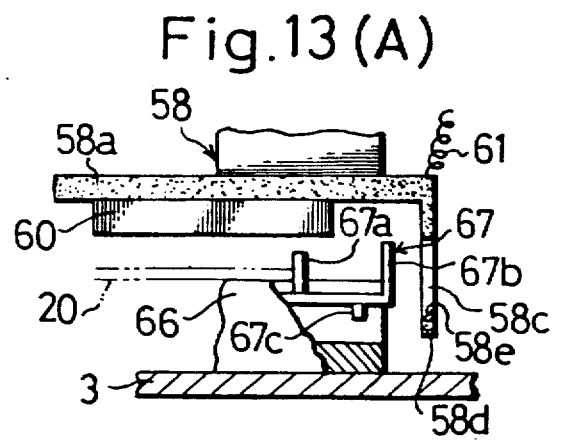
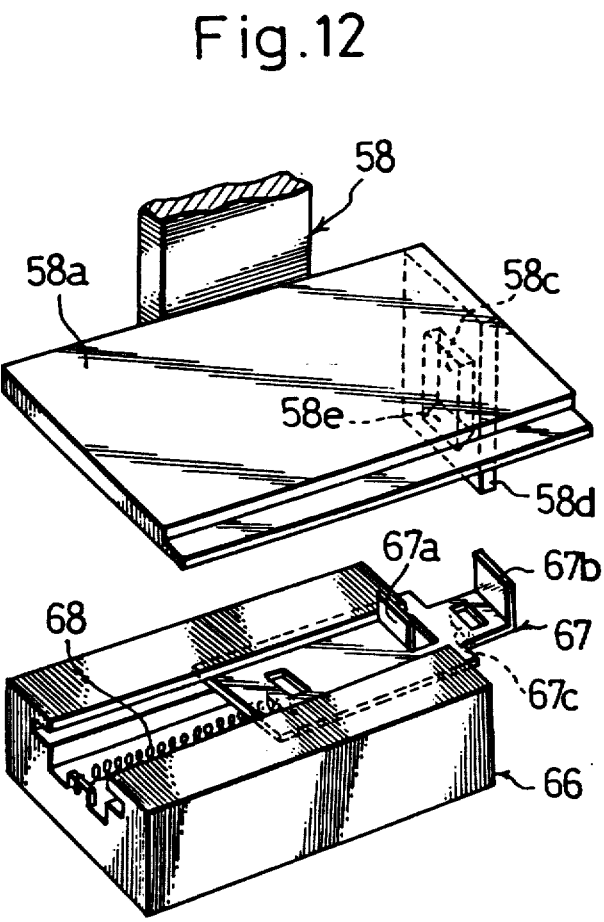
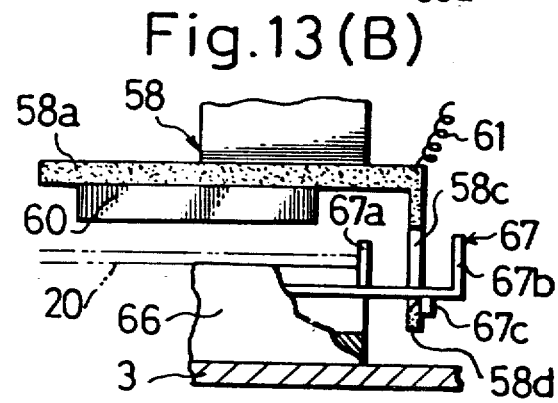
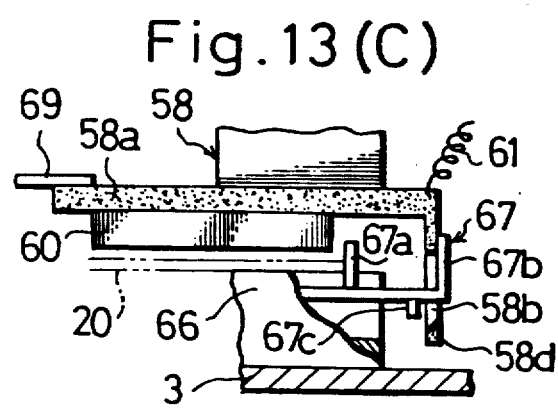
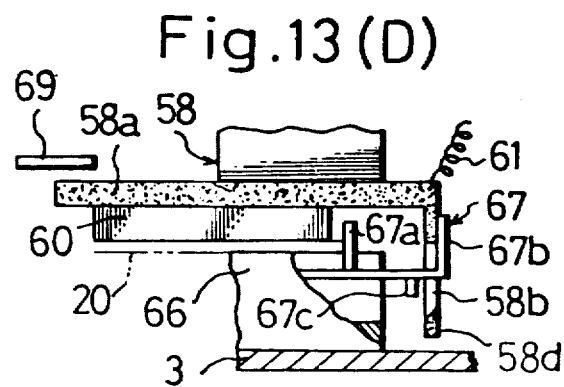

Fig.14(A)
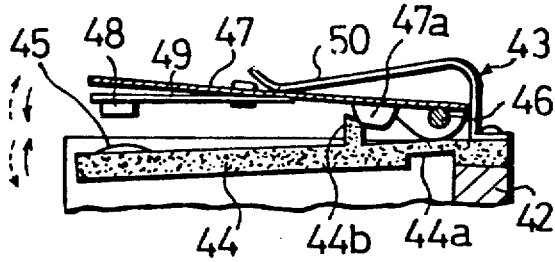
Fig.14(A')
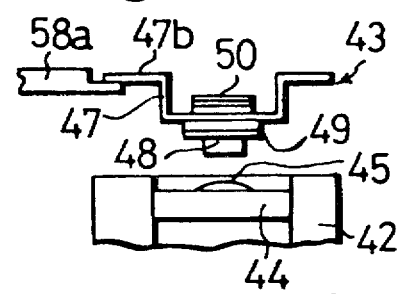
Fig.14(B)
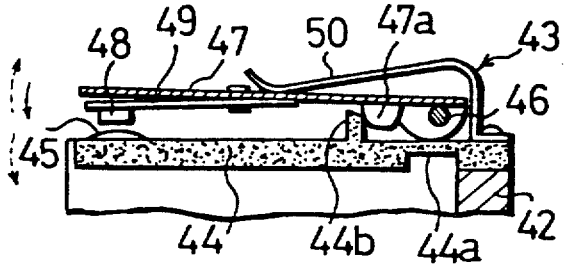
Fig.14(B')
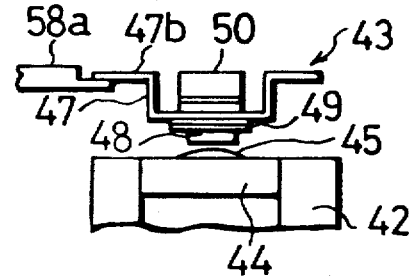
Fig.14(C)
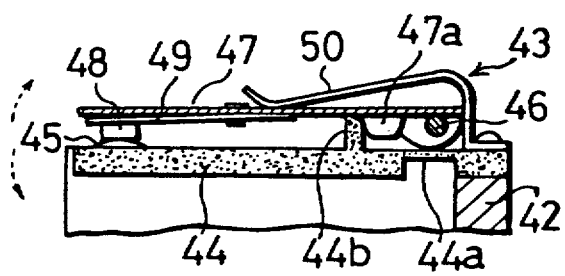
Fig.14(C')
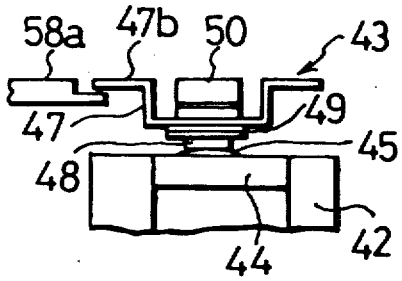
Fig.15
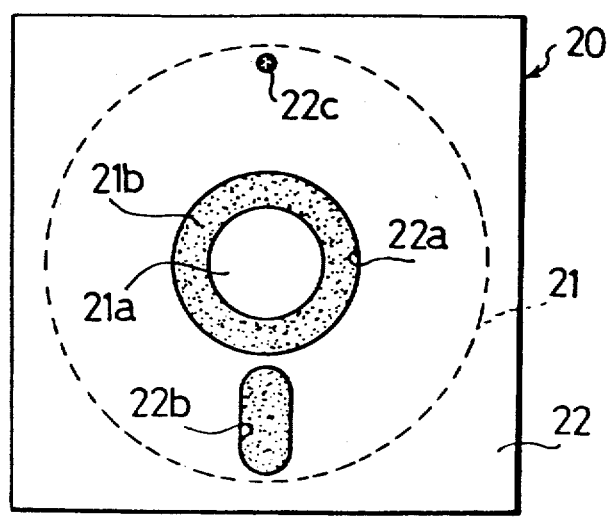

What is claimed is:

1. A disc drive apparatus for bringing a magnetic head into engagement with a flexible magnetic disc; capable of storing information, comprising
    means for rotating a flexible magnetic disc, said rotating means including a rotatable spindle adapted to engage one side of said disc and a clamping member movable into engagement with the other side of said disc to hold said disc to said spindle;
    means including a pivotal arm member connected to said clamping member for moving said clamping member into and out of engagement with said disc;
    a magnetic head assembly including at least one magnetic head;
    a solenoid having a movable plunger;
    positioning means connected to said movable plunger of said solenoid for moving each said magnetic head into and out of engagement with said disc, said positioning means serving to move each said magnetic head into a first position where said magnetic head is away from the path of movement of said disc, a second position near said disc upon movement of said arm member to move said clamping member relative said disc and into a third position engaging said disc upon movement of said plunger into said solenoid, said solenoid including a bore slidably receiving said plunger, said bore being sealed against said plunger to allow air within said bore to be compressed by said plunger as it moves inwardly of said solenoid so to bring each said head into gentle engagement with said disc.

2. A disc drive apparatus as in claim 1, including control means for activating said solenoid to withdraw said plunger into said bore after said clamping member has been brought into engagement with said disc.

3. A disc drive apparatus as in claim 1, each said magnetic head being carried at the free end of a respective support arm cantilevered to a carriage movable radially along said disc.

4. A disc drive apparatus as in claim 3, including a spring constantly urging each said support arm toward said disc.

5. A disc drive apparatus as in claim 1, including means for supporting said magnetic head assembly relative said disc, said supporting means including first and second support arms cantilevered from a carriage movable radially along said disc, said support arms being adapted to receive said disc therebetween, at least one of said support arms carrying a magnetic head.

6. A disc drive apparatus as in claim 5, including spring elements constantly urging said support arms towards one another.

7. A disc drive apparatus as in claim 5, said first and second support arms including co-acting means for holding said support arms out of the path of movement of said disc, said co-acting means including a cam formed on said first support arm and a cam follower formed on said second support arm.

8. A disc drive apparatus as in claim 1, said apparatus including a housing divided into two compartments by a base plate and a respective rotatable spindle being formed on each side of said base plate to enable two flexible discs to be driven simultaneously in each respective compartment, each said compartment having a magnetic head assembly for engaging the respective disc, and a common carriage for moving each said magnetic head assembly radially of the respective disc.

9. A disc drive apparatus as in claim 8, including a single motor for driving each said spindle.

10. A disc drive apparatus for bringing a magnetic head into engagement with flexible magnetic disc capable of storing information, comprising
    means for rotating a flexible magnetic disc, said rotating means including a rotatable spindle adapted to engage one side of said disc and a clamping member movable into engagement with the other side of said disc to hold said disc to said spindle;
    means including a pivotal arm member connected to said clamping member for moving said clamping member into and out of engagement with said disc;
    a magnetic head assembly including at least one magnetic head,
    positioning means connected to said magnetic head assembly for moving each said magnetic head into and out of engagement with said disc, said positioning means serving to move each said magnetic head into a first position where said magnetic head is away from the path of movement of said disc, a second position near said disc upon movement of said arm member to move said clamping member relative said disc and into a third position engaging said disc;
    said positioning means further including first and second support arms cantilevered from a carriage movable radially also said disc, said support arms being adapted to receive said disc therebetween, at least one of said support arms carrying a magnetic head, said first and second support arms including co-acting means for holding said support arms out of the path of movement of said disc to hold each said magnetic head in said second position, said co-acting means including a cam formed on said first support arm and a cam follower formed on said second support arm; and
    positioning means engaging at least one of said arms for moving each said magnetic head into and out of its third position engaging said disc.

11. A disc drive apparatus as in claim 10, said positioning means being adapted to move each said magnetic head into a first position near said disc upon movement of said arm member to move said clamping member relative said disc and later into a second position engaging said disc.

* * * * *

UNITED STATES PATENT AND TRADEMARK OFFICE
CERTIFICATE OF CORRECTION

PATENT NO. : 4,380,782

DATED : April 19, 1983

INVENTOR(S) : Yasuyuki Hirose et al.

It is certified that error appears in the above-identified patent and that said Letters Patent is hereby corrected as shown below:

The title page showing the illustrative figure should be deleted to appear as per attached title page.

In the drawings the three (3) sheets of drawings should be deleted to be replaced with the nine (9) sheets of drawings as shown on the attached sheets.

Signed and Sealed this

Fifth Day of November 1985

[SEAL]

Attest:

DONALD J. QUIGG

Attesting Officer

Commissioner of Patents and Trademarks

United States Patent [19]

Hirose et al.

[11] 4,380,782
[45] Apr. 19, 1983

[54] DRIVE APPARATUS FOR FLEXIBLE MAGNETIC DISCS

[75] Inventors: Yasuyuki Hirose; Motohiro Shimaoka; Shoichiro Saito; Toru Kowaguchi, all of Furukawa, Japan

[73] Assignee: Alps Electric Co., Ltd., Tokyo, Japan

[21] Appl. No.: 107,067

[22] Filed: Dec. 26, 1979

[30] Foreign Application Priority Data

Dec. 28, 1978 [JP] Japan ................. 53-162525

[51] Int. Cl.³ .............. G11B 5/016; G11B 17/02; G11B 21/12
[52] U.S. Cl. .................... 360/99; 360/105
[58] Field of Search ............ 360/99, 97, 105, 106

[56] References Cited

U.S. PATENT DOCUMENTS

| 4,012,791 | 3/1977 | Bleiman | 360/105 |
| 4,024,581 | 5/1977 | Lesca et al. | 360/106 |
| 4,193,102 | 3/1980 | Beuch et al. | 360/99 |
| 4,218,714 | 8/1980 | Isozaki et al. | 360/105 |

*Primary Examiner*—Robert S. Tupper
*Attorney, Agent, or Firm*—Guy W. Shoup; Gerard F. Dunne

[57] ABSTRACT

A disc drive apparatus for use in recording data on a flexible magnetic disc and/or reproducing data recorded on such a disc, has small dimensions and is capable of being manufactured at a low cost. This apparatus includes structures for preventing a disc and the read/write head from colliding when the disc is inserted into the apparatus. In addition, the apparatus permits two discs to be rotated simultaneously by one drive motor and one carriage carrying two head mechanisms is moved by one step motor.

11 Claims, 22 Drawing Figures